(12) United States Patent
Emigh

(10) Patent No.: US 9,330,360 B1
(45) Date of Patent: *May 3, 2016

(54) RECOMMENDATION ENGINE RATIONALIZATION

(71) Applicant: Aaron Emigh, Incline Village, NV (US)

(72) Inventor: Aaron Emigh, Incline Village, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/942,987

(22) Filed: Nov. 16, 2015

Related U.S. Application Data

(63) Continuation of application No. 14/147,236, filed on Jan. 3, 2014, now Pat. No. 9,189,740.

(60) Provisional application No. 61/748,729, filed on Jan. 3, 2013.

(51) Int. Cl.
  *G06F 17/00* (2006.01)
  *G06N 5/04* (2006.01)
  *G06Q 30/06* (2012.01)
  *G06N 5/02* (2006.01)

(52) U.S. Cl.
  CPC ............... *G06N 5/045* (2013.01); *G06N 5/02* (2013.01); *G06Q 30/0631* (2013.01)

(58) Field of Classification Search
  None
  See application file for complete search history.

(56) References Cited

U.S. PATENT DOCUMENTS

| 2009/0132905 A1* | 5/2009 | Hoshino | G06F 17/30743 715/230 |
| 2012/0004954 A1* | 1/2012 | Eisinger | G06Q 30/0207 705/14.1 |
| 2014/0095346 A1* | 4/2014 | Zhao | G06Q 30/0631 705/26.7 |

OTHER PUBLICATIONS

Symeonidis et al. MoviExplain: A Recommender System with Explanations. RecSys'09, Oct. 23-25, 2009, New York, New York, USA.*

* cited by examiner

*Primary Examiner* — Stanley K Hill
*Assistant Examiner* — David H Kim

(57) ABSTRACT

In some embodiments, techniques for rationalizing a recommendation include determining a recommended item for a user using a first recommendation engine, wherein the first recommendation engine receives as an input first behavioral data associated with a user, and generates an identifier corresponding to a recommended item; creating a rationalization for the recommended item using a first rationalization engine, wherein the first rationalization engine receives as inputs the recommended item and second behavioral data associated with the user, and generates a rationalization, wherein the rationalization includes a constructed rationalization of why the recommended item is recommended for the user, and wherein the creation of the rationalization is not based solely on an actual reason the first recommendation engine determined the recommended item; associating the rationalization for the recommended item with the recommended item; and providing the recommended item and associated rationalization.

20 Claims, 3 Drawing Sheets

RECOMMENDATION ENGINE RATIONALIZATION

CROSS REFERENCE TO RELATED APPLICATIONS

This application is a continuation of co-pending U.S. patent application Ser. No. 14/147,236, entitled RECOMMENDATION RATIONALIZATION, filed, Jan. 3, 2014, which claims priority to U.S. Provisional Patent Application No. 61/748,729, entitled RECOMMENDATION RATIONALIZATION, filed Jan. 3, 2013, which is incorporated herein by reference for all purposes.

FIELD OF THE INVENTION

The present invention relates generally to the area of recommendation systems. More specifically, techniques for providing human-interpretable explanations for recommendations are disclosed.

BACKGROUND OF THE INVENTION

Recommendation systems are widely deployed, and are a critical component of the success of such established technology companies as Amazon and Netflix, as well as newcomers such as Pandora. It is highly desirable to tell users why a recommendation is being made. Such an explanation increases users' assessment of the quality of the recommendations, and incurs forgiveness when a bad recommendation is being made. However, the best recommendations are often made by complex machine learning systems, which can employ algorithms that do not lend themselves to human-interpretable explanations. Therefore, there is an impasse in which companies often elect not to use the best recommendation algorithms, or suffer the consequences of not explaining recommendations to users.

Accordingly, it would be useful to have a way to use the best recommendation engines available, while offering users a plausible explanation for the recommendations being made.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a non-transitory computer readable storage medium (such as a magnetic storage medium, e.g. a disk, an electronic storage medium, e.g. a flash memory, or an optical storage medium, e.g. a CD-ROM or DVD-ROM) or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
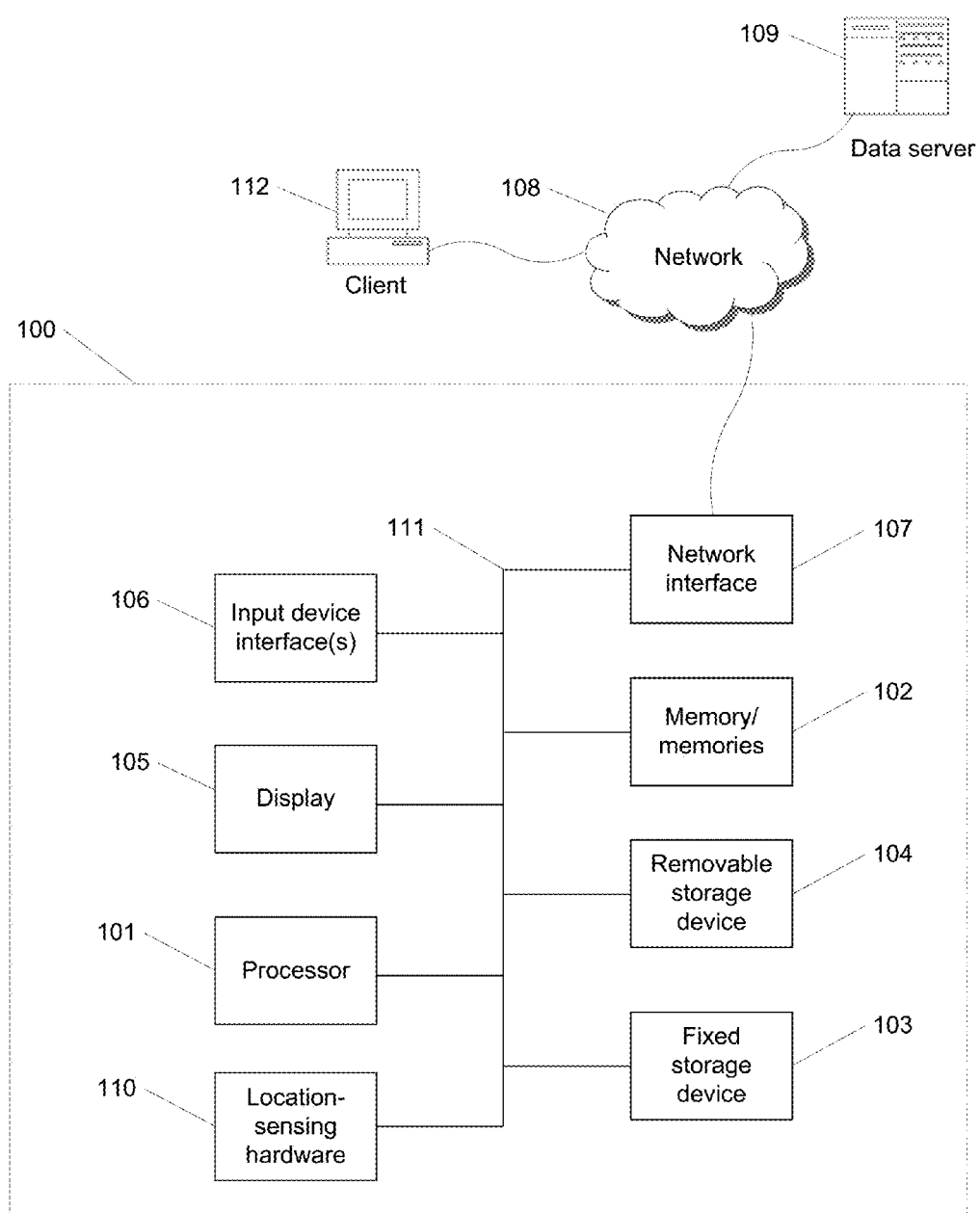
FIG. 1 is a diagram of a system for recommendation rationalization, according to some embodiments.

FIG. 1 is a diagram of a system for recommendation rationalization, according to some embodiments. As will be apparent, other computer system architectures and configurations can be used. In this example, computing device 100, which may be any device that can perform the techniques described herein, such as a computer, a smartphone, a tablet computer, a wearable computer embedded in a bracelet, watch, glasses, etc., includes various subsystems as described below. It includes at least one microprocessor subsystem (also referred to as a processor or a central processing unit (CPU)) 101. In various embodiments, processor 101 may be implemented by a single-chip processor or by multiple processors. In some embodiments, processor 101 is a general purpose digital processor having one or more cores. Using instructions retrieved from one or more memories 102, processor 101 controls the reception and manipulation of input data, and the output and display of data on output devices (e.g., display 105). In some embodiments, processor 101 performs the client-side techniques described below in conjunction with the remaining Figures.

Processor 101 is coupled bi-directionally with a memory 102. Memory 102 may comprise multiple memories, and is referred to in the singular purely for expository simplicity. Memory 102 may include a first primary storage, typically a random access memory (RAM), and a second primary storage, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 101. Also as well known in the art, primary storage typically includes basic operating instructions, program code, data and objects used by the processor 101 to perform its functions (e.g., programmed instructions). In some embodiments, primary memory 102 may include any suitable computer-readable storage media, described below, depending on whether, for example, data access needs to be bidirectional or unidirectional. In some embodiments, processor 101 may also directly retrieve and store frequently needed data in one or more cache memories (not shown).

Fixed storage device 103 may provide data storage capacity for computing device 100, and is coupled either bidirectionally (read/write) or unidirectionally (read only) to processor 102. Examples of fixed storage device 103 include computer-readable media such as flash memory, a hard disk drive, an optical storage device such as a DVD-ROM, and other storage devices that retain their data when computing device 100 is powered off. Fixed storage device 103 may store additional programming instructions, data, and the like for processor 101, which may for example be loaded into memory 102 for use by processor 101 as needed. In some embodiments, a removable storage device 104, for example a flash memory card such as an SD card, a Micro SD card, or an SDHC card, provides additional data storage capacity. It will be appreciated that the information retained within storage devices 103, 104 can be incorporated, if needed, in standard fashion as part of memory 102 as virtual memory.

Display 105 may be any form of human-readable display, such as an LCD screen. Display 105 may display text and/or graphics as instructed by processor 101. In various embodiments, display 105 may be integrated with computing device 100, or may be separate and an interface between the two may be included in each respective component.

Input device interface(s) 106 provide interfaces, such as USB, through which user input may be received. Examples include a keyboard, a mouse, and a touchscreen.

Location sensing hardware 110 may be connected, directly or indirectly, to processor 101. Location sensing hardware 110 may be any hardware that can determine a current location of itself and/or a vehicle in which it is embedded, and/or motions that are being experienced. Examples of location sensing hardware 110 include a GPS (Global Positioning System) satellite receiver, an accelerometer, a physical motion sensor such as a switch, micro switch, or magnetic reed switch, and/or a location receiving device such as a wirelessly networked device that receives information relating to a current location from transmitters, directly or indirectly.

Network interface 107 is hardware that provides access to network 108. In some embodiments, such as for wired networks, network interface 110 may include a plug, such as an Ethernet plug. In some embodiments, such as for wireless networks, network interface 107 may include an antenna.

Network 108 may be any type of network, for example a public network such as the internet or a cellular phone network such as a GPRS network. In another example, the network 108 may be an enterprise or home network, a virtual private network, or a wireless network such as an 802.11 or Bluetooth (including Bluetooth Low Energy) network. In another example, RFID reading via NFC (near field communications) may be a network 108. In some embodiments, the network 108 may include more than one network. An example of a network 108 including more than one network is a local area network connected to a public network such as the internet. An example of the use of such a network is for a computing device 100 to be connected via a local area network such as an enterprise network (for example via a wireless router), and for the local area network to be connected to data server 109 and/or client 112 via a public network such as the internet.

Bus 111 may provide access between the various subsystems of computing device 100. Bus 111 is illustrative of any interconnection scheme serving to link the subsystems, including multiple independent and/or connected buses. Other computer architectures having different configurations of subsystems, and various other interconnection schemes, can also be utilized.

Other subsystems (not shown) may also be connected to bus 111, such as a digital camera, a microphone, and other subsystems known to those skilled in the art.

Data server 109 is connected, directly or indirectly, to the network 108. Data server 109 may provide data to computing device 100 via network 108, for example by TCP/IP, HTTP, and/or proprietary protocols. In various embodiments, data server 109 (which in some embodiments may encompass several physical servers and/or services) may provide data relating to behavioral information useful in making recommendations, as well as other data as needed. Internally, data server 109 may be structured as discussed in conjunction with computing device 100, and in some embodiments, computing device 100 may be a data server 109.

Client 112 is connected, directly or indirectly, to the network 108. Client 112 may receive data from computing device 100 and/or data server 109 via network 108, for example by TCP/IP, HTTP, and/or proprietary protocols, and may present data to, and receive input from, one or more users. Internally, client 112 may be structured as discussed in conjunction with computing device 100, and in some embodiments, computing device 100 may be a client 112.

The techniques of the remaining figures can be run on one or more components of the system of this FIG. 1, as described above. In general, running techniques on this system comprises executing operations stored as numbers in memory 102 on processor 101, wherein the operations comprise computer-interpretable instructions for performing the techniques, by receiving data at processor 101 from memory 102, fixed storage device 103, and/or network interface 107, for example via bus 111, manipulating the data as specified, including using memory 102 for the inputs, intermediate values, and outputs needed for said manipulations, and using registers internal to processor 101, transmitting data to network interface 107, fixed storage device 103, and/or memory 102 (for example via bus 111), receiving inputs from input device interface 106 (for example via bus 111), and displaying results via display 105 (for example via bus 111). Such running may take place on computing device 100, data server 109 and/or client 112, and may take the form of direct execution of machine-readable code specifying operations to perform in order to perform the techniques, e.g. for machine code or code that has been compiled into machine code, or of the execution of an interpreter that interprets either source code specifying the techniques, or a compiled intermediate code (such as bytecode for a JVM) specifying the techniques, and performs the actions so specified.

Figure 2:
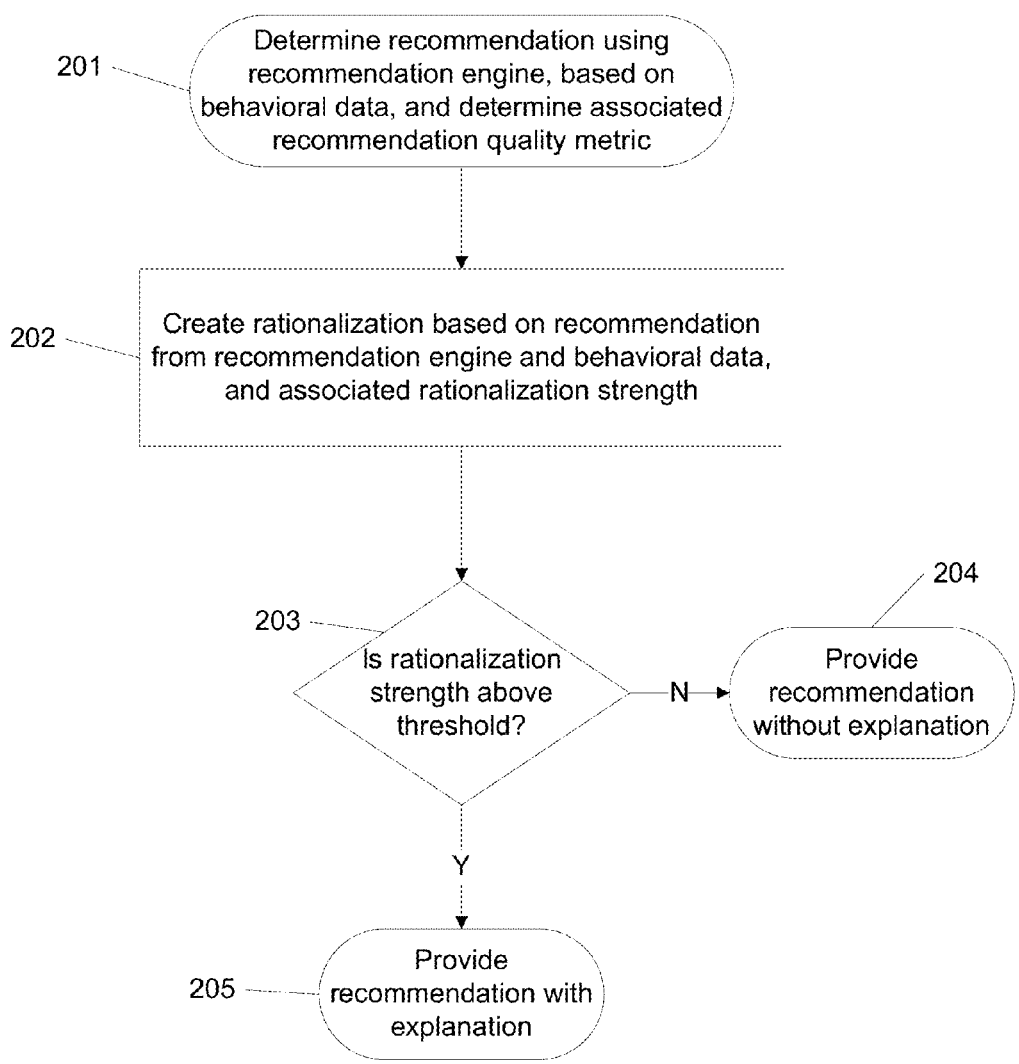
FIG. 2 is a flow diagram of a method for rationalizing a recommendation, according to some embodiments.

FIG. 2 is a flow diagram of a method for rationalizing a recommendation, according to some embodiments.

In this example, a recommendation is determined using a recommendation engine (201). Such a recommendation may be determined, for example, by using a recommendation engine such as a support vector machine, a neural network, a Bayesian network, clustering, latent semantic models such as singular value decomposition, neighborhood-based algorithms using Pearson correlation or vector cosines, k-nearest-neighbor, locality-sensitive hashing, or any other algorithm known in the art, for example any of the algorithms described in Montaner, Lopez, and de la Rosa, *A Taxonomy of Recommender Agents on the Internet* (Artificial Intelligence Review Vol. 19, Issue 4, pp. 285-330), Adomavicius and Tuzhilin, *Toward the Next Generation of Recommender Systems: A Survey of the State-of-the-Art and Possible Extensions* (IEEE Transactions on Knowledge and Data Engineering Vol. 17, Issue 6, pp. 734-749), and the algorithms described all of the papers published in conjunction with the competitors for the Netflix Prize, or any constituent thereof (including without limitation Koren, *The BellKor Solution to the Netflix Grand Prize*, Töscher, Jahrer, and Bell, *The BigChaos Solution to the Netflix Grand Prize*, and Piotte and Chabbert, *The Pragmatic Theory solution to the Netflix Grand Prize*) which are available online from Netflix, all of which are herein incorporated by reference in their entirety for all purposes. Such a recommendation engine may be based on collaborative or content filtering, or a hybrid thereof, and may use behavioral data, such as information about items that have been viewed, liked, rated (with an associated rating), purchased, placed into a virtual shopping cart, etc. by a user for whom a recommendation is being made and/or other users, and/or information about a current session of a user for whom a recommendation is being made, such as which items have been viewed, a current item being viewed, etc., and may base its recommendations in whole or in part on such behavioral data. Along with a determination of a recommendation (such as a product, a piece of content to be consumed, etc.), an associated recommendation quality metric may be determined that indicates the strength of the recommendation according to the engine. For convenience, this will be discussed as if a real number from 0 (being a weak recommendation) to 1 (being an exceptionally strong recommendation), though those skilled in the art will readily appreciate that any mapping of recommendation strength to a quantifiable number may be equivalently used.

In general, the recommendation and optional associated recommendation quality metric may be received from a black-box recommendation engine, which may operate on a separate server or servers, and which may be opaque in its operations. In some embodiments, this may take the form of a data structure in a memory that includes a reference to an item that is recommended for a given user, based on behavioral information as discussed above, and optionally an associated numerical recommendation quality metric. Such a reference may be an item number, which may for example be usable as a key in a database lookup to obtain further information about the associated item, and/or may include additional information about the item, such as a name, category, etc.

A rationalization may be created for the recommendation (202). A rationalization refers herein to a human-understandable rationale for a recommendation, which may or may not correspond to the actual reason a recommendation engine generated the recommendation.

One example of a way in which a rationalization may be created by using a population of one or more rationalization engines, which operate similarly to simple (i.e. human-intelligible) recommendation engines, but are different in that they generate rationalizations of how they would best recommend an item being a priori recommended, rather than generating actual recommendations. Such a rationalization engine may take a recommendation as an input for a given user, e.g. in the form of an identifier such as a SKU that identifies the recommendation, and generate a rationalization for the recommendation.

An example of such a rationalization engine is an item-to-item rationalizer that generates rationalizations of the form e.g. "people who bought/viewed/liked/etc. item 1 also bought/viewed/liked/etc. item 2." (In further discussion, a "like" is used to describe a user action, but one skilled in the art will readily recognize that rather than a "like," any suitable action may be used, such as a purchase, view, rent, etc.) For example, an item-to-item rationalization engine may take the recommended item and figure out a strongly correlated item to it which the user had also liked, e.g. the most strongly correlated such item, or the most uniquely correlated such item. This can for example be done by finding a candidate set of items (which may be, for example, items that the user also liked) in order of strength of correlation (for example correlation of the candidate item to the recommended item), and selecting a best matching item (for example the most highly correlated item) from among the candidate set that the user also liked as the rationalized connecting item. In another example, the rationalized connecting item may be the most strongly correlated item for which the highest associated rating, or the strongest action (e.g. a purchase being stronger than a "like," and a "like" being stronger than a view) has been received from the user. In these examples, a correlation between a recommended item and another item may refer to an item that commonly co-occurs as liked as well as the recommended item, e.g. by the same user, and a strength of correlation may refer to the frequency with which such a correlation occurs, the percentage of times that the recommended item is liked by a user in which the other item is also liked, or vice-versa, a Pearson correlation coefficient, or other correlation metrics known to those skilled in the art. In some embodiments, a k-nearest-neighbor implementation may be used.

One example of selecting a rationalized connecting item is going through an ordered list of correlated items as described above until one is found that was also liked by the same user, and selecting that as the rationalized connecting item. Another example of selecting a rationalized connecting item is to perform a database query (e.g. from a relational database, or an in-memory NoSQL database) to retrieve such an item, or a set of such items to select the best according to criteria such as those described above.

Once a rationalized connecting item has been selected, it may be used in a rationale of the form "We recommend <recommended item> because people who liked <rationalized connecting item> also liked it." Such a rationale may be stored as a textual representation, or in intermediate form without such text, e.g. as imply the rationalized connecting item, or in an in-memory data structure containing an identifier for the rationalized connecting item and an encoded representation of the relationship between the recommended item and the rationalized connecting item, e.g. indicating that they were both liked by the user.

Another example of such a rationalization engine is a item-to-item rationalization engine that generates rationalizations based on a commonality in metadata between the recommended item and the rationalized connecting item. For example, metadata about the recommended item such as genre, director, manufacturer, ingredients, performer, etc. can be examined to find some commonality with things that the user liked, and when such a commonality is found, it can be used as the rationale. Such a rationalization engine may operate similarly to the operation described above, except that correlated items refer to similarities in metadata, and the strength of correlation may refer to a maximum of predetermined strengths for matching metadata fields, or the sum of such predetermined strengths for all matching metadata fields. Such a rationalization engine may produce rationalizations of the form e.g. "<recommended item> is similar to <rationalized connecting item>, which you like, because <way(s) they are similar>." This may, for example, be expressed as "<recommended item> is an action movie, and you like action movies," in the case of a commonality in category, "<recommended item> stars John Cusak, and you liked <rationale item>, which also stars John Cusak," in the case of a commonality in performer/ingredient, etc. As described above such a recommendation may be stored in textual or intermediate encoded form.

Another example of a rationalization engine is a user-to-item rationalization engine, which generates recommendations of the form "users like you because <commonality type> also liked <recommended item>." In some embodiments, this may be used as a fallback, e.g. without a commonality type, which may not even be true. In other embodiments, a commonality type reflecting a shared taste preference may be provided, e.g. people who also like a certain category of products, such as electronic gadgets or action movies. In some embodiments, a demographic or geographic commonality type may be used, i.e. young adults, or residents of a region or city. Operation of such a rationalization engine is similar to what is described above, in which correlation may refer to an affinity amongst users sharing an attribute with the user for whom the recommendation is being made, and strength of correlation may refer to the degree of such an affinity.

In some embodiments, a single rationalization engine may be used. In some embodiments, multiple rationalization engines may be used. On example of using multiple rationalization engines is to use a first engine, such as an item-to-item rationalization engine based on a rationalized connecting item, and if no suitable result is found, to use a second rationalization engine, such as an item-to-item rationalization engine based on metadata commonality, and if no suitable result is found, falling back on a third rationalization engine, such as a user-to-item rationalization engine.

Another example of using multiple rationalization engines is to have each rationalization engine include as well as a rationale (if one is available), an associated rationalization strength, which may for example reflect the correlation strength that has been determined as described above, which may be multiplicatively scaled by a predetermined factor for the engine reflecting a subjective strength of recommendations generated by the engine, for example taking into account that an item-to-item rationalization engine generally generates better rationales than a user-to-item rationalization item. Such rationalization strengths may be stored in an in-memory data structure along with an encoding of the associated rationalization. The rationalization with the highest associated rationalization strength may be selected as the rationalization.

It may be determined whether the rationalization strength associated with the rationalization exceeds a predetermined threshold (203). If it is determined that the rationalization strength meets or exceeds the threshold (203), then in this example, the recommendation may be presented with the rationalization as an explanation of why the recommendation was made (205). For example, the rationalization may be provided in a header, in a caption, in a mouse-over text, etc. along with the recommendation. In some embodiments, the explanations may be provided immediately with the recommendations, In some embodiments, the rationalizations can be behind a UI element that the user selects in order to get an explanation of why the recommendation was made.

If it is determined that the rationalization strength does not meet or exceed the threshold (203), then in this example, the recommendation may be presented without an explanation of why the recommendation was made (204), or with a predetermined generic explanation such as "People like you also liked <recommended item>."

Figure 3:
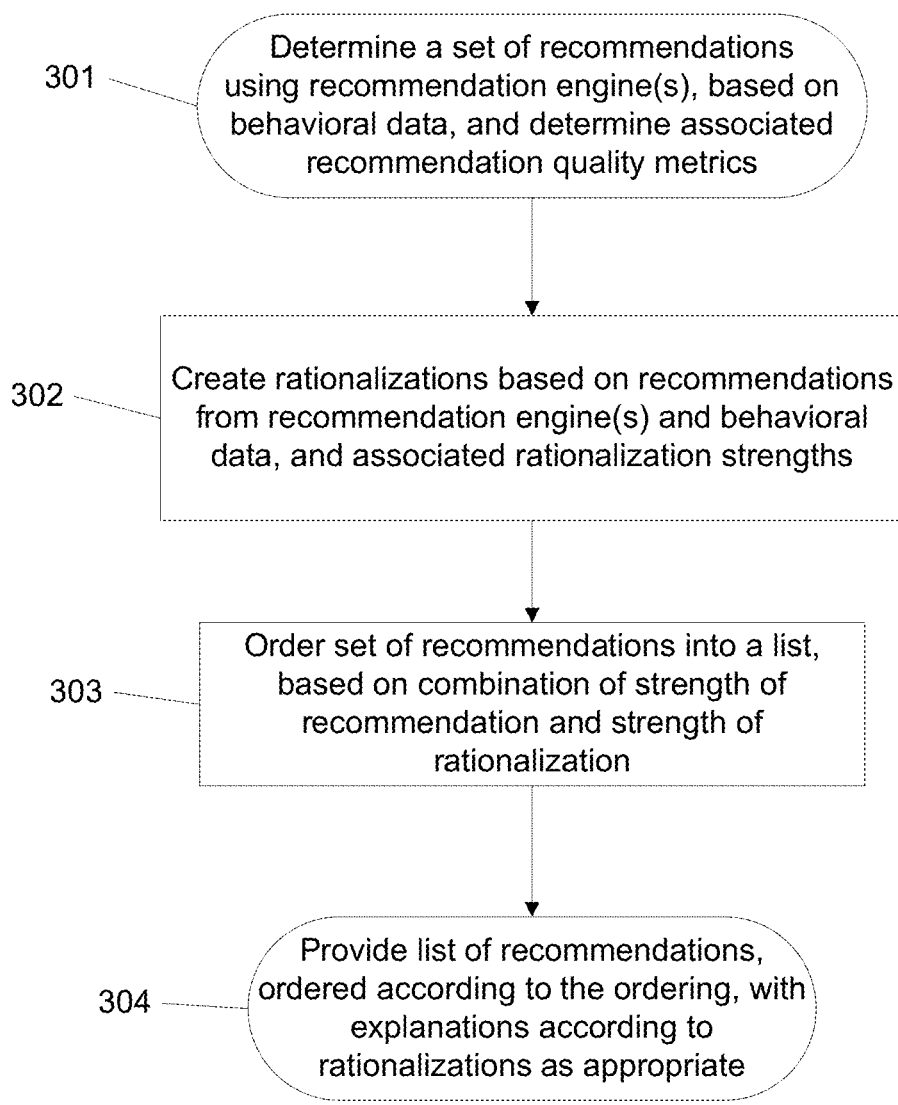
FIG. 3 is a flow diagram of a method for providing recommendations with associated rationalizations, according to some embodiments.

FIG. 3 is a flow diagram of a method for providing recommendations with associated rationalizations, according to some embodiments.

In this example, a set of recommendations is determined (301). Examples of determining such recommendations are discussed in conjunction with 201 of FIG. 2. In some embodiments, a single recommendation engine as described in that section may be used. In some embodiments, multiple such recommendation engines may be used.

Rationalizations for each recommendation, or some subset of recommendations, may be created (302), for example as discussed in conjunction with 202 of FIG. 2. Such rationalizations may have associated rationalization strengths.

The recommendations may be ordered, for example into a list, based on the strength of the recommendation and/or the strength of the associated rationalization (303). Such an ordering may use a recommendation/rationalization strength metric (hereinafter referred to as an RRSM) for each recommendation, which may incorporate the recommendation and/or rationalization strengths. One example of calculating an RRSM is to use the recommendation strength as the RRSM. Another example of calculating an RRSM is to use the rationalization strength as the RRSM. Another example of calculating an RRSM is to use a combination of the recommendation and rationalization strengths as the RRSM. For example, a linear combination in which the recommendation strength is multiplied by a scaling factor (such as 0.8) and the rationalization strength is multiplied by a scaling factor (such as 0.2) and the two resultant products are added together to create the RRSM. In some embodiments, recommendations for which no suitable rationalization was created (e.g. no rationalization, or no rationalization meeting a quality threshold as discussed in conjunction with 203 of FIG. 2) are eliminated from the list.

The recommendations with associated rationalizations may be ordered, for example into a list, based on the associated RRSM's, e.g. largest first.

The list of recommendations may be provided in the determined order (304). In some embodiments, all recommendations may be provided with associated rationalizations. In some embodiments, only recommendations having associated rationalizations meeting a minimum quality metric (for example as discussed in conjunction with 203 of FIG. 2) may be provided with associated rationalizations and others not meeting such minimum quality metric may be provided without associated rationalizations. One example of providing the recommendations is to show them in a list, with explanations corresponding to the associated rationalizations, for example as discussed in conjunction with 205 of FIG. 2. In such embodiments, all rationalizations in the list may be shown, or only the top N (such as five) may be shown, and more may be shown in response to a user interaction with a user interface element to see more, such as selection of a "next" button, scrolling down to the end of an infinite list, mousing over an area designated to scroll to more recommendations, etc.

Another example of providing the recommendations and explanations is to encode them together in a data structure and pass them to another programmatic component, e.g. in memory or via a network.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method performed on at least one computing device, said at least one computing device comprising at least one microprocessor coupled to a memory, comprising executing instructions on the at least one microprocessor for:

determining a recommended item for a user using a first recommendation engine, wherein the first recommendation engine receives as an input first behavioral data associated with a user, and generates an identifier corresponding to a recommended item;

creating a rationalization for the recommended item using a first rationalization engine, wherein the first rationalization engine receives as inputs the recommended item and second behavioral data associated with the user, and generates a rationalization, wherein the rationalization includes a constructed rationalization of why the recommended item is recommended for the user, and wherein the creation of the rationalization is not based solely on an actual reason the first recommendation engine determined the recommended item;

associating the rationalization for the recommended item with the recommended item; and providing the recommended item and associated rationalization.

2. The method of claim 1, wherein the first recommendation engine is at least one of a support vector machine, a neural network, a Bayesian network, a clustering-based recommender, k-nearest-neighbor, and a latent semantic model.

3. The method of claim 1, wherein creating the rationalization for the recommended item further comprises generating a candidate set of items, selecting a best matching item from among the candidate set of items, and including the best matching item in the rationalization.

4. The method of claim 3, wherein the best matching item is determined based at least in part on an amount of correlation between the best matching item and the recommended item.

5. The method of claim 3, wherein the rationalization includes an explanation that people who performed an action associated with the best matching item also performed the action in association with the recommended item, wherein the user has performed the action associated with the best matching item.

6. The method of claim 5, wherein the action is liking.

7. The method of claim 5, wherein the action is at least one of purchasing and renting.

8. The method of claim 5, wherein the action is viewing.

9. The method of claim 1, wherein the rationalization includes an explanation that people similar to the user had an affinity for the recommended item.

10. The method of claim 1, wherein the recommended item is a product for at least one of sale and rental.

11. The method of claim 1, wherein the recommended item is multimedia content.

12. The method of claim 1, further comprising determining a second recommended item, determining a second rationalization for the second recommended item, associating the second rationalization with the second recommended item, determining a first metric associated with the recommended item, determining a second metric associated with the second recommended item, and ordering the recommended item prior to the second recommended item based at least in part of a comparison between the first metric and the second metric.

13. The method of claim 12, wherein the first metric includes a quantification the quality of the recommendation of the recommended item, and wherein the second metric includes a quantification of the quality of the second recommendation of the second recommended item.

14. The method of claim 12, wherein the first metric includes a quantification of the quality of the rationalization, and wherein the second metric includes a quantification of the quality of the second rationalization.

15. A system, comprising:
at least one microprocessor configured to:
  determine a recommended item for a user using a first recommendation engine, wherein the first recommendation engine receives as an input first behavioral data associated with a user, and generates an identifier corresponding to a recommended item;
  create a rationalization for the recommended item using a first rationalization engine, wherein the first rationalization engine receives as inputs the recommended item and second behavioral data associated with the user, and generates a rationalization, wherein the rationalization includes a constructed rationalization of why the recommended item is recommended for the user, and wherein the creation of the rationalization is not based solely on an actual reason the first recommendation engine determined the recommended item;
  associate the rationalization for the recommended item with the recommended item; and
  provide the recommended item and associated rationalization; and
at least one memory coupled with the at least one microprocessor, wherein the at least one memory provides instructions to the at least one microprocessor.

16. The system of claim 15, wherein creating the rationalization for the recommended item further comprises generating a candidate set of items, selecting a best matching item from among the candidate set of items, and including the best matching item in the rationalization.

17. The system of claim 15, wherein the at least one microprocessor is further configured to determine a second recommended item, determine a second rationalization for the second recommended item, associate the second rationalization with the second recommended item, determine a first metric associated with the recommended item, determine a second metric associated with the second recommended item, and order the recommended item prior to the second recommended item based at least in part of a comparison between the first metric and the second metric.

18. A computer program product, the computer program product being embodied in a non-transitory computer readable medium and comprising computer instructions for:
  determining a recommended item for a user using a first recommendation engine, wherein the first recommendation engine receives as an input first behavioral data associated with a user, and generates an identifier corresponding to a recommended item;
  creating a rationalization for the recommended item using a first rationalization engine, wherein the first rationalization engine receives as inputs the recommended item and second behavioral data associated with the user, and generates a rationalization, wherein the rationalization includes a constructed rationalization of why the recommended item is recommended for the user, and wherein the creation of the rationalization is not based solely on an actual reason the first recommendation engine determined the recommended item;
  associating the rationalization for the recommended item with the recommended item; and
  providing the recommended item and associated rationalization.

19. The computer program product of claim 18, wherein creating the rationalization for the recommended item further comprises generating a candidate set of items, selecting a best matching item from among the candidate set of items, and including the best matching item in the rationalization.

20. The computer program product of claim 18, further comprising computer program instructions for determining a second recommended item, determining a second rationalization for the second recommended item, associating the second rationalization with the second recommended item, determining a first metric associated with the recommended item, determining a second metric associated with the second recommended item, and ordering the recommended item prior to the second recommended item based at least in part of a comparison between the first metric and the second metric.

* * * * *